3,201,458
HERBICIDAL ESTERS OF α,α-DICHLOROBUTYRIC ACID
Guenter Scheuerer and Horst Pommer, Ludwigshafen (Rhine), Herbert Stummeyer, Mannheim, and Adolf Fischer, Mutterstadt, Pfalz, Germany, assignors to Badische Anilin- & Soda-Fabrik Aktiengesellschaft, Ludwigshafen (Rhine), Germany
No Drawing. Filed Oct. 23, 1961, Ser. No. 147,019
3 Claims. (Cl. 260—487)

This invention relates to new esters of chlorinated carboxylic acids and to herbicidal compositions containing these esters as the active ingredients.

It is known to use esters of chlorinated aliphatic acids as herbicides. However, these esters have no superior weed killing effect as compared with the alkali salts of chlorinated aliphatic acids.

It is furthermore known to use chlorinated carboxylic acids for weed killing. The selectivity of these acids in the control of wild oats is however very unsatisfactory.

It is an object of this invention to provide new esters of chlorinated carboxylic acids, more specially esters of the said type having herbicidal action and being superior as herbicides to the carboxylic acids from which they have been derived.

A further object of this invention is to provide new esters of the said type which are useful in the destruction of weeds, especially wild oats (Avena fatua).

A further object of this invention is to provide new esters of the said type which can be used for controlling wild oats without harming crop plants.

These objects are achieved by compounds of the general formula

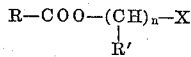

in which R denotes α,α-dichloropropyl or α,α-dichloroethyl radical, X denotes a halogen atom or a cyano group, R' denotes hydrogen or an alkyl group and $n$ denotes one of the whole numbers 1, 2, 3 and 4.

For the purposes of this invention, halogen is meant to include chlorine and bromine, and alkyl is meant to include methyl, ethyl and propyl.

The esters to be used according to this invention may be prepared by conventional methods, for example by reaction of the acid chlorides of α,α-dichloropropionic acid or α,α-dichlorobutyric acid with the substituted alcohols, or by esterification of the free acids with the alcohols in the presence of a catalyst, for example sulfuric acid or p-toluenesulfonic acid, and in the presence of a hydrocarbon capable of azeotropic distillation with water, for example benzene, toluene or ethylene chloride. Aliphatic alcohols which have been halogenated or substituted by cyano groups may be used as the alcohol components, for example ethylene cholohydrin, propylene chlorohydrin, 3-chloropropanol, 4-chlorobutanol, glycol nitrile, or β-cyano-ethyl alcohol. The esters may be prepared, for example, by the following method.

A mixture of 65 parts (parts by weight) of triethylamine and 44 parts of ethylene cyanohydrin is dripped while stirring at 0° to 20° C. into a solution of 90 parts of trichloroacetyl chloride in 500 parts of toluene. After all has been added, the whole is stirred for two hours at room temperature and for another two hours at 50° C. The toluene solution is then washed with water and 2 N hydrochloric acid, dried with sodium sulfate and the toluene evaporated in vacuo. 79 parts of trichloroacetic acid β-cyanoethyl ester is obtained which boils at 110° C. at 0.8 mm Hg pressure. Its refractive index is $n_D^{25}=1.4759$.

In the same way, there are obtained from 44 parts of ethylene cyanhydrin and:

(a) 80 parts of α,α-dichloropropionic acid chloride, 68 parts of α,α-dichloropropionic acid β-cyanoethyl ester of the boiling point 82° to 84° C. at 0.2 mm. Hg pressure and the refractive index $n_D^{25}=1.4607$;

(b) 87 parts of α,α-dichlorobutyric acid chloride, 74 parts of α,α-dichlorobutyric acid β-cyanoethyl ester of the boiling point 112° to 115° at 0.4 mm. Hg pressure and the refractive index $n_D^{25}=1.4626$.

Another method for the production of the esters is as follows:

284 parts of α,α-dichloropropionic acid, 176 parts of ethylene chlorohydrin, 0.5 part of p-toluenesulfonic acid and 120 parts of benzene are heated to boiling, the water formed being continuously separated from the distillate and the benezene continuously recyled. 36 parts of water is separated from the distillate in this way within 4 hours. The benzene solution of the ester in the reaction vessel is washed with water and fractionally distilled. 390 parts of α,α-dichloropropionic acid β-chloroethyl ester is thus obtained wihch boils at 94° C. at 13 mm. Hg pressure and has the refractive index $n_D^{25}=1.4625$.

In an analogous way, 373 parts of α,α-dichlorobutyric acid β-chloroethyl ester of the boiling point 100° C. at 12 mm. Hg pressure and the refractive index $n_D^{25}=1.4647$ are obtained from 314 parts of α,α-dichlorobutyric acid with ethylene chlorohydrin. Further, by this means, there are obtained from 39 parts of α-methyl-β-chloroethyl alcohol and:

(a) 44 parts of α,α-dichloropropionic acid, 52 parts of α,α-dichloropropionic acid α-methyl-β-chloroethyl ester with a boiling point of 108° C. at a pressure of 20 mm. Hg and the refractive index $n_D^{25}=1.4570$;

(b) 48.5 parts of α,α-dichlorobutyric acid, 53 parts of α,α-dichlorobutyric acid α-methyl-β-chloroethyl ester with a boiling point of 118° C. at a pressure of 21 mm. Hg and the refractive index $n_D^{25}=1.4603$.

The esters may be used in the usual way, for example as sprays in the form of aqueous dispersions or emulsions, and may be mixed with known herbicides or conventional type carriers, for example water, benzene, toluene, clay, volcanic ash, bentonite, talcum, kieselguhr, silica gel and wood flour.

The following examples illustrate the use of the herbicides according to this invention.

*Example 1*

Seeds of wild oats (*Avena fatua*), mustard (*Sinapis alba*) and cleavers (*Galium aparine*) were sown in sandy soil and then aqueous emulsions of trichloroacetic acid-β-chloroethyl ester were sprayed uniformly on the soil in amounts equivalent to an application of 10 liters of active substance dispersed in 1000 liters of water per hectare. After about five weeks, the plants of mustard (*Sinapis alba*) and cleavers (*Galium aparine*) showed strong growth inhibition, whereas the wild oats were practically completely destroyed.

The following esters have a similar effect: α,α-dichloropropionic acid β-cyanoethyl ester; α,α-dichloropropionic acid β-chloroethyl ester; α,α-dichlorobutyric acid β-cyanoethyl ester and α,α-dichlorobutyric acid β-chloroethyl ester when used in amounts of 5 to 10 liters of active substance per hectare.

Example 2

Young plants of peas (*Pisum sativum*), beetroot (*Beta vulgaris*), onions (*Allium cepa*), mustard (*Sinapis alba*) and wild oats (*Avena fatua*), which had grown to the 1st to 3rd leaves in the greenhouse, were sprayed with trichloroacetic acid β-cyanoethyl ester in an amount equivalent to an application of 8 liters of active substance dispersed in 1000 liters of water per hectare. At first, the plants grew normally as compared with unsprayed control plants. After about a fortnight, chlorotic blanching was observed on the mustard (*Sinapis alba*) and wild oats (*Avena fatua*), especially at the tips and edges of the leaves. The plants of peas (*Pisum sativum*), beetroot (*Beta vulgaris*) and onion (*Allium cepa*) showed only slight changes. After two more weeks, the wild oats plants (*Avena fatua*) were clearly inhibited in their growth. The plants of peas (*Pisum sativum*,) onion (*Allium cepa*) and mustard (*Sinapis alba*) exhibited only slight growth inhibition, while the beetroot plants (*Beta vulgaris*) appeared to be quite normal after this period.

α,α-Dichlorobutyric acid-α-methyl-β-chloroethyl ester is equally effective when used in the same amounts as described above.

Example 3

An aqueous emulsion of trichloroacetic acid β-chloroethyl ester was sprayed on cyperus (*Cyperus rotundus*) and couch grass (*Agropyrum repens*) in amounts equivalent to an application of 30 to 40 liters of active substance dispersed in 1000 liters of water per hectare. The plants began to wither after a few days and had almost completely withered after six weeks.

Example 4

Beetroot (*Beta vulgaris*) was sown in plots of light sandy land 2 square meters in area. After the plants had emerged, i.e., in the cotyledon stage of the beetroot (*Beta vulgaris*), trichloroacetic acid β-cyanoethyl ester (I), trichloroacetic acid β-chloroethyl ester (II) and sodium trichloroacetate salt (III) were sprayed onto the plants in amounts equivalent to an application of 5, 10 or 15 liters of the individual esters of 5, 10 or 15 kilograms of the sodium salt dispersed or dissolved in 1000 liters each of water per hectare. After five weeks, it was observed that the plants of wild oats (*Avena fatua*) and annual meadow grass (*Poa annua*), which had emerged from the soil, had been satisfactorily controlled by all three agents when 10 and 15 liters or kilograms of active substance per hectare were used. The beetroot plants (*Beta vulgaris*) exhibited normal growth as compared with untreated plants only where active substances I and II were used in amounts equivalent to 5, 10 and 15 liters of active substance per hectare. When using the active substance III, especially in amounts equivalent to 10 or 15 kilograms per hectare, clear inhibition in growth of the beetroot plants (*Beta vulgaris*) was observed.

Example 5

A test plot infested with wild oats (*Aevna fatua*) was sprayed with an aqueous emulsion of the α-methyl-β-chloroethyl ester of dichlorobutyric acid, prepared with sodium lignin sulfonate as emulsifier, in an amount of 5 to 10 kg. of active substance to 1000 liters of water per hectare, and the substance evenly worked into the soil down to a depth of 5 cm. Then beetroot (*Beta vulgaris*) was sown into the 2 cm. top layer. For comparison purposes beetroot was simultaneously sown in untreated soil. The two plots were examined after 4 weeks.

Compared to the beetroot plants sown in the untreated soil those sown in the treated soil showed no difference in growth. However, while the wild oats had reached a height of 12 cm. in the untreated plot, it had not emerged at all in the plot treated with the α-methyl-β-chloroethyl ester of dichlorobutyric acid or, if so, had stopped growing close to the ground with every sign of growth inhibition. After two more weeks, the remaining plants of wild oats had completely died.

What we claim is:

1. An ester selected from the group consisting of β-chloroethyl-α,α-dichlorobutyrate and α-methyl-β-chloroethyl-α,α-dichlorobutyrate.
2. β-Chloroethyl-α,α-dichlorobutyrate.
3. α-Methyl-β-chloroethyl-α,α-dichlorobutrate.

References Cited by the Examiner

UNITED STATES PATENTS

| | | | |
|---|---|---|---|
| 2,393,086 | 1/46 | Bousquet | 71—2.7 |
| 2,394,520 | 2/46 | Lichty | 260—465.4 |
| 2,468,352 | 4/49 | Warner et al. | 260—465.4 |
| 2,550,049 | 4/51 | Eaker | 71—2.7 |
| 2,613,220 | 10/52 | Eaker | 260—487 |
| 2,642,354 | 6/53 | Barrons | 71—2.7 |
| 2,689,790 | 9/54 | Mowry et al. | 71—2.7 |
| 3,084,094 | 4/63 | Gertler | 260—487 |

FOREIGN PATENTS

| | | |
|---|---|---|
| 1,077,477 | 3/60 | Germany. |
| 815,200 | 6/59 | Great Britain. |

OTHER REFERENCES

Berlande: C. A., 20, page 1054 (1926).
Braun et al.: Chemical Abstracts, vol. 21, 2875 (1927).
Ladd et al.: C. A., 44, page 7346 (1950).
Lichty: C. A., 40, page 7232 (1946).
Marvel et al.: C. A., 35, page 1029 (1941).
Titov et al.: Chemical Abstracts, vol. 50, page 2420 (1956).
Triggs: C. A., 43, page 3027 (1949).
Vogel: Journal of the Chemical Society, London, pages 1845 and 1849 (1948).

CHARLES B. PARKER, *Primary Examiner.*